(12) United States Patent
Moya et al.

(10) Patent No.: US 6,202,543 B1
(45) Date of Patent: Mar. 20, 2001

(54) REMOVAL OF PARTICULATES FROM FRYING OILS

(75) Inventors: Emmanuel G. Moya; Steven D. Ford, both of Fresno; Thomas Lisy, Clovis, all of CA (US)

(73) Assignee: Claude Laval Corporation, Fresno, CA (US)

( * ) Notice: Subject to any disclaimer, the term of this patent is extended or adjusted under 35 U.S.C. 154(b) by 0 days.

(21) Appl. No.: 09/399,014

(22) Filed: Sep. 21, 1999

(51) Int. Cl.[7] .............................. A23L 1/00; A47J 37/00; A47J 37/12; B01D 36/00

(52) U.S. Cl. .............................. 99/330; 99/337; 99/403; 99/408; 210/167; 210/DIG. 8

(58) Field of Search .............................. 99/326–331, 337, 99/338, 403–417; 126/391, 378; 210/167, 196, 416.5, 418, 512.1, 519, 521, 532.1, DIG. 8; 219/441, 439, 442; 426/233, 438

(56) References Cited

U.S. PATENT DOCUMENTS

| | | | |
|---|---|---|---|
| 3,722,498 | * | 3/1973 | Kimbrough .................. 99/403 X |
| 3,760,793 | * | 9/1973 | Anetsberger et al. ............... 126/391 |
| 4,210,123 | * | 7/1980 | Moore et al. ...................... 99/330 X |
| 4,444,095 | * | 4/1984 | Anetsberger et al. ............. 99/330 X |
| 4,481,873 | * | 11/1984 | Keating ................................. 99/403 |
| 4,599,990 | * | 7/1986 | Fritzsche et al. ................ 210/167 X |
| 4,602,612 | * | 7/1986 | Schwizer ........................ 126/390 X |
| 4,668,390 | * | 5/1987 | Hurley et al. ........................ 210/167 |
| 4,684,412 | * | 8/1987 | Fritzsche ............................ 99/408 X |
| 4,722,267 | * | 2/1988 | Galockin et al. .................. 99/407 X |
| 4,751,915 | * | 6/1988 | Price .................................... 126/391 |
| 4,945,893 | * | 8/1990 | Manchester ....................... 99/403 X |
| 5,811,006 | * | 9/1998 | Ford ................................... 210/512.1 |

\* cited by examiner

*Primary Examiner*—Timothy Simone
(74) *Attorney, Agent, or Firm*—Donald D. Mon

(57) ABSTRACT

A system for use with a hot oil fryer of the type which cooks food porducts in hot oil, in which particulates from the food are shed into the hot oil in the fry during the cooking operation, the fryer having an inlet to receive hot oil, and an outlet for recirculation of hot oil.

6 Claims, 3 Drawing Sheets

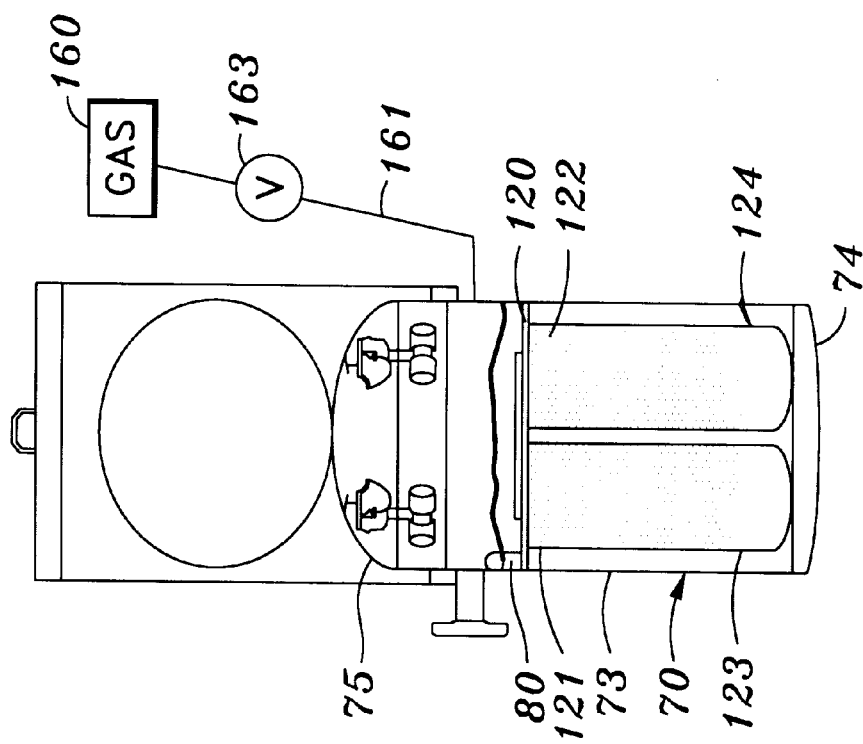
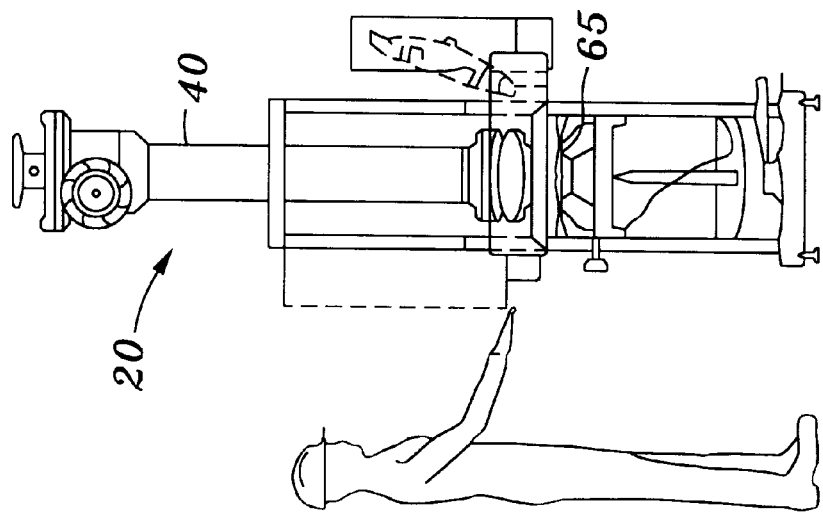

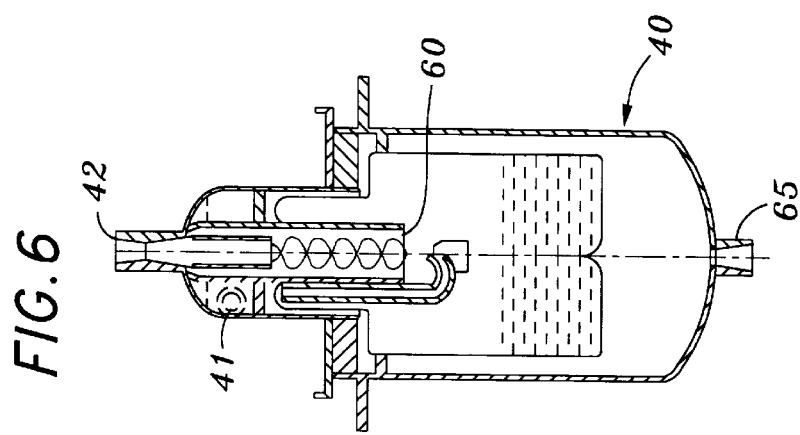
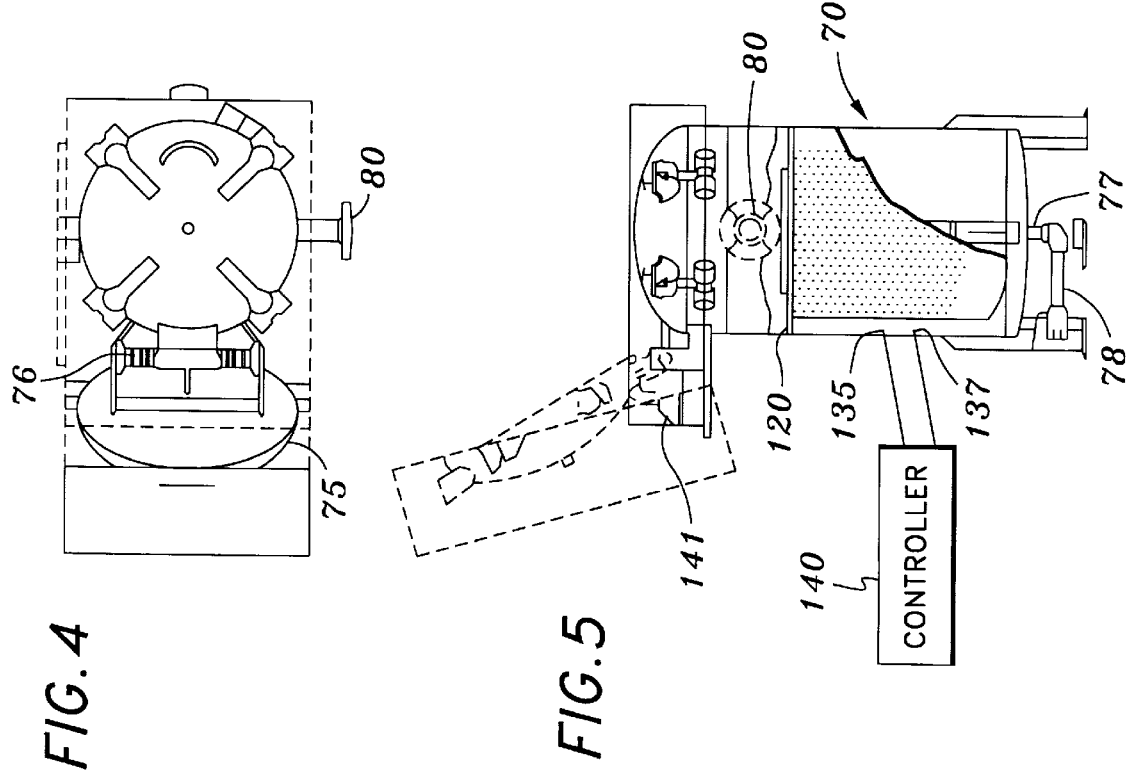

REMOVAL OF PARTICULATES FROM FRYING OILS

FIELD OF THE INVENTION

Apparatus for the continuous removal of particulates from the hot oil used to fry food products, such as potato chips and tortilla chips, and for interim extraction of the particulates without stopping the removal process.

BACKGROUND OF THE INVENTION

In the production of fried food products, the quality of the oil used for frying the products is directly linked to the quality of the final product. Corn and potato products such as potato chips and corn chips shed particulates during the frying process.

When these particulates or crumbs accumulate in the frying oil, if they are not promptly removed there will be breakdown in the quality of the oil and the product as evidenced by an increase in free fatty acids in the oil, discoloration of the oil, plugging of heat transfer surfaces, and a reduction in the quality of the product it produces. Prompt removal of the particulates dramatically improves the quality of the oil and of the product compared to what their condition would be if the particulates were not removed.

One simplistic solution is to filter the oil and change it frequently. There are several problems with this approach. For one these production facilities are generally operated on a 24 hour basis, and shutdown time is both inconvenient and expensive. In fact, a full shutdown and servicing may require 24 hours.

For another, these facilities use large quantities of oil. It is not unusual for a fryer to contain 1,500 gallons of oil. Unnecessarily frequent changes of the oil are very costly.

As still another problem, the frying temperatures are often as high as 420 degree, and the flow of hot oil through the heat exchanger and flow system is under pressure. The continuous removal of crumbs from known operating systems tends to expose the operator to exposure of hot pressurized oil. This is an undesirable risk which this invention averts, while still providing filtration of 150 micron particulates.

In fact it is an object of this invention to enable continuous filtration and removal of cooled particulates without exposing personnel to hot or pressurized oil or to particulates in such a way that the ultimate change of oil can be deferred from the presently-accepted six day cycle to a 21 day cycle, while still maintaining good quality oil and product. This equates to an extra 44 days of production per year, approximating a 15% increase in production capacity for an installation.

It should be kept in mind that the operation of this process is continuous. The fryers receive the raw product on a conveyor, which carries it through the hot oil, and removes it from the oil, thereafter to be drained, cooled and packaged. Some oil is carried out of the apparatus as part of the product, and makeup oil is added to replace it. The particulates (crumbs) are separated as part of the filtration process. After filtration the oil is returned to the fryer along with any makeup oil.

One of the most troublesome parts of the cooker system is the heat exchanger in which the oil is heated. It is a recirculating arrangement usually utilizing externally heated tubes through which the oil flows to be heated. These tubes are the hottest part of the system, and crumbs can tend to cake and coat its internal surfaces and plug the tubes. The system of this invention consistently removes particulates of such small size that deposition on the tubes is long deferred compared to known systems, and when it is flushed out in the servicing operation, it is readily removed.

To service any hot oil system requires that the pressure be reduced to ambient, and the temperature be cooled to an acceptable value. This takes time and significantly reduces the production capacity of the system. Allowing servicing to proceed at higher temperatures, and before the pressure has vented can subject the service personnel to risk of injury.

It is an object of this invention to provide a system which enables continuous frying to occur while filtration continues, and which permits particulates to be removed through a system that protects service personnel from risk, and can be done without shutting down the entire system.

BRIEF DESCRIPTION OF THE INVENTION

This invention is carried out along with a hot oil fryer. Characteristics of the fryer are its capability to accept raw food, carry it into a pool of hot cooking oil, and remove the cooked (fried) product for draining, cooling and ultimately being packaged. In order to maintain cooking temperatures it has a heater, and means to circulate the oil so it is at the proper temperature to cook the food.

According to this invention, means for removal of particulates shed from the food into the oil includes a centrifugal separator to separate particulates from the oil, and a plurality of closed vessels each containing a filter or screen to retain particulate matter and store oil from the separator.

According to a preferred feature of this invention a selector valve selects one of the vessels at a time to receive the particulates while closing the other vessels.

According to yet another feature of the invention, each vessel has a closure which can be opened to remove particulates from it only when the temperature and pressure in the vessel are at values agreed to be safe, ordinarily 0 psig and less than 100 degrees Fahrenheit.

According to a preferred but optional feature of the invention, each vessel is accompanied by a manually-operated handle which overhangs the vessel to impede its being opened unless the vessel is disconnected from the hot oil system, and can be made the operator of isolation valves that give or prevent access of oil to a respective vessel.

According to yet another preferred but optional feature of the invention, a shield overhangs the vessel to prevent access to the mechanism for manually opening the vessel.

According to still another preferred feature of the invention, a safety latch system assures that a vessel cannot be opened unless the temperature and pressure in the vessel are safe for personnel.

According to an optional feature of the invention, a vessel blow-down is provided to expel hot oil from a vessel from which particulates are to be removed to shorten the time required for the contents to cool to a safe temperature for handling.

The above and other features of this invention will be fully understood from the following detailed description and the accompanying drawings, in which:

BRIEF DESCRIPTION OF THE DRAWINGS

FIG. 2 is a side elevation of the system;

FIG. 3 is a front view of a vessel partly in cutaway cross-section;

FIG. 4 is a top view of FIG. 3;

FIG. 5 is a side elevation of FIG. 3, and

FIG. 6 is an axial cross-section of a centrifugal separator useful with this invention.

DETAILED DESCRIPTION OF THE INVENTION

Figure 1:
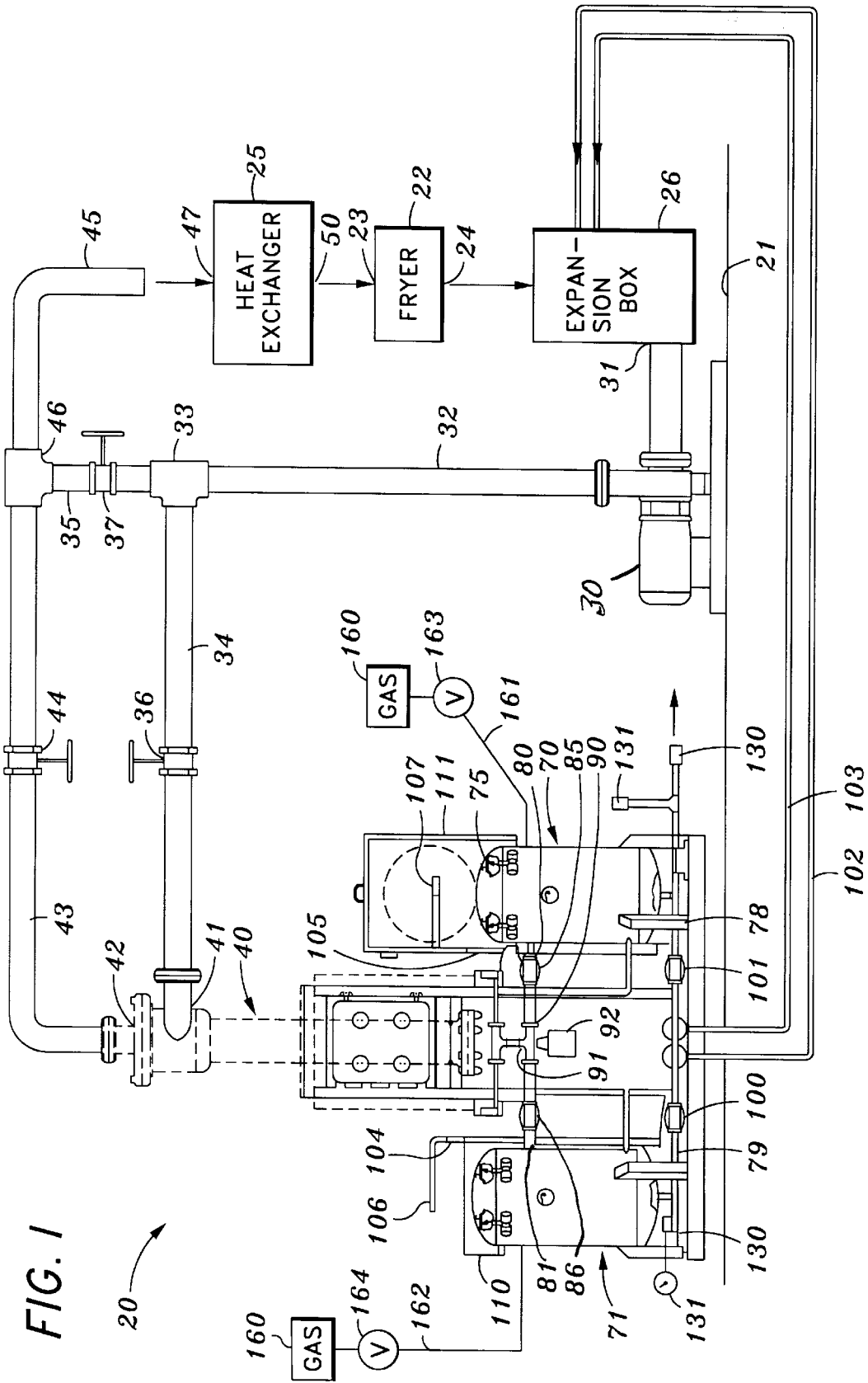
FIG. 1 is an elevation of the preferred embodiment of the invention, partly in schematic notation.

A system 20 according to this invention is shown in FIG. 1. It is mounted to the floor 21 or to a skid as preferred. It is used in combination with a conventional hot oil fryer 22 having an oil inlet 23 and an oil outlet 24. The details of the fryer are not important to this invention, and will not be described in detail. Suffice it to say that it includes a vessel to contain hot oil through which food products to be cooked are passed and from which they are removed. The object of this invention is to keep the oil in the fryer in an acceptable condition with minimum down time for servicing.

The fryer receives heated oil from a heat exchanger 25 that heats the oil to the desired temperature. The system of the invention provides for circulation of oil to and through the heat exchanger and the fryer. An expansion box 26 is provided to allow for surges and thermal expansion. It is at atmospheric pressure. An expansion box is a useful accessory. However, it is optional. Instead the discharge from the fryer can be provided directly to the pump. The hydraulic system is provided with such valves and restrictors as are required for proper flow conditions.

A pump 30 receives oil to be circulated from outlet 31 of the expansion box or if preferred directly from the fryer. It directs oil under the proper pressure through conduit 32 to a union 33 that branches to conduit 34 and to by-pass conduit 35. Valve 36 is fitted in conduit 34. Valve 37 is fitted in conduit 35.

A centrifugal separator 40 has an inlet port 41 connected to conduit 34 and an outlet port 42. Pressurized oil from the pump through conduits 32 and 34 is fed to the separator to separate particulates from the stream. The separator includes a drain port 65 at its bottom through which particulates are removed.

Oil exits the separator from outlet port 42 through conduit 43. Valve 44 is fitted in conduit 43. Conduit 45 is fitted to union 46 which also is fitted to conduits 35 and 43.

In turn, conduit 45 is connected to the inlet 47 of the heat exchanger so as to provide oil to the heat exchanger from the separator, or oil which has been by-passed through the by-pass conduit.

The outlet 50 of the heat exchanger is connected to the inlet 23 of the fryer, and thus supplies heated oil to the fryer to cook the product.

If all oil is to be by-passed, valve 37 will be opened and valves 36 and 44 will be closed. If all oil is to pass through the separator, valve 37 will be closed, and valves 36 and 44 will be open. If only a portion of the oil is to pass through the separator on a continuous basis, the valves may be appropriately set, or a restrictor plate (not shown) may be placed in conduits 35, 35, or elsewhere for the same purpose.

The centrifugal separator is a well-known type exemplified in U.S. Pat. No. 5,811,006, issued Sep. 22, 1998, which is incorporated herein by reference in its entirety for its detailed disclosure of a suitable device. Briefly, as shown in FIG. 6, the oil stream from the pump is fed tangentially into a cylindrical chamber 60. It swirls around the wall as it descends. The particulates are moved toward the wall by centrifugal force. Near the bottom of the wall they escape downwardly, while the stream from which particulates have been removed flow upwardly to the exit port and thence into conduit 40.

Of importance to this invention is the fact that the solids (particulates) settle to the bottom of the separator and flow (with some oil) out from its drain port 65 at the bottom. The reader will observe that this occurs in a liquid-filled pressurized system.

The removal of these particulates from the system is the purpose of this invention.

Vessels 70, 71 are provided to receive the particulates and oil from drain port 65 of the separator. They are identical, so only vessel 70 will be described in detail. It includes a conventional pressure wall 73 with a concave bottom 74 and a cover 75 hinged by hinges 76 to the wall 73. For convenience, the hinges are spring-loaded to bias the cover toward its open position and help keep it there while the vessel is open. Typical manually operable screw-down lug attachments are provided to hold the cover closed and sealed to retain the contents under pressure.

An outlet port 77 through the bottom of the vessel connects to a return line 78. A corresponding return line 79 connects to the bottom of vessel 71.

Vessel 70 has an inlet port 80 through its wall. Vessel 71 has a inlet port 81 through its wall. These ports are connected through respective block (off-on) isolation valves 85, 86 to a three way selector valve 90 which has a port 91 connected to drain port 65 of the separator. It receives particulates and oil from the bottom of the separator.

Selector valve 90 has two settings: closed to one vessel and open to the other; and open to said one vessel and closed to the other. A valve actuator 92 is provided to select the setting.

Block-type isolation valves 100, 101 are plumbed into return lines 102, 103. These return lines return oil drained from the vessels to the expansion box or directly to the fryer. It is important that in either case the return lines are placed above the oil level of the fryer to prevent the siphoning of oil from the fryer, and to relieve vessel pressure to ambient.

Isolation valves 100 and 101 are respectively linked to rotary shafts 104, 105. These shafts are also respectively linked to isolation valves 85 and 86. The shafts must be turned to close the respective valve before the cover can be lifted, and this is an important safety feature. The shafts assure that the respective isolation valve 85 or 86 is closed, and the respective block valve 100 or 101 is also closed before there can be access to the vessel.

These shafts have overhanging handles 106, 107. When the respective valves 100 and 101 are open, their respective handles will overhang the cover, and prevent access to it so the cover cannot be opened. The isolation valves 100 and 86 are linked, and isolation valves 101 and 85 are linked. The respective shaft must be turned to close the respective valve set before the vessel cover can be lifted. This safety feature prevents the siphoning of oil through the vessel if the fryer oil level is too high. To assure that the vessels will be properly vented to ambient, a valve 130 will be opened when the vessel is to be opened.

Attention is called to concave shields 110, 111 which are hinged to the respective vessel. Should there be any discharge of oil, the shield will direct it downwardly so it cannot hit a worker. The shield must be lifted to give access to the cover. It is hinged to the vessel for this purpose.

The interior of each vessel is fitted with a barrier 120 which extends across it well above the bottom. Apertures 121, 122 receive screens 123, 124 which seal around the edges of the aperture and extend below the barrier. When the vessel is serviced, they are lifted out and their contents of particulates (and some entrained oil) will be disposed of separately. After they have been cleaned they will be again placed in the apertures.

The screens are most conveniently formed in the illustrated basket shape. It walls are formed of metal screen, or such other screening or filtration structure as desired. Wire mesh screens, square woven 100 mesh will readily screen out 150 micro particulates.

Preferably an orifice plate (not shown) will be installed downstream from each vessel outlet to keep some back pressure on the screen so it does not face the entire differential pressure during the screening operation.

The resulting particulates as they are taken out of the filter vary in consistency, but the collected mass rather resembles wet coffee grounds. This mass slides out of the filter like a cylinder and then breaks up. It is readily disposed of.

Also, it may be commented that when the oil is finally changed in the entire system, as it must ultimately be, the oil is not discarded. Instead, because of the filtration treatment it has received, it is still useful when sufficiently diluted with new oil. For this reason, the old oil is gradually fed into the fryer during subsequent operations, along with fresh make up oil. There is little lost to waste.

A vessel drain valve 130 is plumbed in the system. Similarly, an oil make-up valve 131 is plumbed to a return line for providing make up oil. These are duplicated at each vessel.

In order to assure that the vessels cannot be opened unless the temperature and pressure are safe for personnel, temperature probe 135, and a static pressure probe 137 is provided for each vessel. These probes may be switches responsive to the respective condition so as to be included in a control circuit. This data, and also data respective to the position of the selector valves is provided to a controller 140. The purpose of this data is to assure that the temperature and pressure are proper, and that the other vessel than the one to be opened is available so the system can continue to operate. This system ultimately controls a lock-out member 141 which may be a simple air-actuated piston-cylinder motor or other latch-type device biased toward a position locking the safety shield from being raised unless the motor shaft is pulled by air pressure permitted by the controller to be applied to the actuator. Only when the three parameters are in the agreed condition will the lock-out member permit the respective cover to be lifted. The lock-out member most conveniently restrains the shield and bars access to the vessel cover. Alternatively, the cover itself might be latched.

A source 160 of compressed gas such as air or nitrogen is connected by line 161, 162 to a respective vessel, with an off-on valve 163, 164 in a respective line. The line enters the vessel above the barrier. Gas introduced into the vessel after the vessel is isolated drives the hot oil from the vessel, leaving only the particulates to cool. The cooling time for the vessel is reduced from about 6 hours to about 1.5 hours, reducing from about 385 degrees Fahrenheit to about 100 degrees Fahrenheit. This is a substantial convenience in the servicing of the system.

In a typical installation, about 350 gallons per minute will enter the centrifugal separator. Only about 7 gallons per minute will pass through the vessel. The entire system flow will have undergone centrifugal separation, but only the separated solids—the slow flow of solids from the bottom of the separator needs to be passed through a vessel.

It will be recognized that the setting of the valves can be manually made, or can be made with actuators. In any event, the position of the valves must be appropriate to the existing circumstances. For this reason the system is provided with the lock-out which is supervised by the control which requires concurrent levels of temperature, pressure and vessel availability for a vessel to be opened while the fryer system is in operation. The position of the lock-out member is also sensed by the controller.

The operation of the system will be understood from the foregoing. It enables the removal of particulates while the system remains in operation, and the removal can be done safely. This enables a longer period of useful production to be enjoyed before the inevitable shutdown for cleanout of the system, especially of the heat exchanger. This extended time between shutdowns is equivalent to a substantial increase in plant capacity without requiring an additional fryer, which fryers are very costly.

This invention is not to be limited by the embodiments shown in the drawings and described in the description, which are given by way of example and not of limitation, but only in accordance with the scope of the appended claims.

We claim:

1. A system for use with a hot oil fryer of the type which cooks food products in hot oil, in which particulates from the food are shed into the hot oil in the fryer during the cooking operation, the fryer having an inlet to receive hot oil, and an outlet for recirculation of hot oil; said system comprising:

a centrifugal separator of the type having a separator inlet, a cylindrical wall along which hot oil from the fryer is discharged from the inlet for separation of particulates, a separator outlet for oil from which particulates have been separated, and a separator drain port for release of separated particulates; a conduit from said separator outlet to return said oil to said fryer;

a pair of closed vessels, each having a vessel inlet port and a vessel drain port, a barrier across the inside of each vessel, an aperture in each said barrier, a filter in each of said apertures the vessel inlet port and vessel drain port being on opposite sides of said barrier;

a selector valve having an inlet connected to the separator drain port and an outlet connected to each of said vessel inlet ports, said selector valve having settings respective flow to one of said vessels and not to the other, and no flow to said one of said vessels and flow to the other; said vessel drain ports being connected to a return conduit to return separated oil to the fryer;

each said vessel having a cover adapted to sealingly close the vessel, releasable means to hold the cover closed, and a hinge which mounts the cover to the vessel, said cover being adapted to be lifted in a hinge movement to give access to said filter;

a first isolation valve between each vessel inlet port and the respective outlet of said selector valve;

a second isolation valve between each vessel drain port and said return line;

a rotatable shaft operatively connected to a first and second of said isolation valves adapted to set both respective isolation valves simultaneously in an open to flow or closed to flow condition;

a temperature sensor and a pressure sensor responsive to these condition in each vessel;

a position sensor responsive to the condition of each said first isolation valve;

a safety latch adapted selectively to prevent and to permit said cover to be opened; and a controller responsive to said sensor adapted to actuate said safety latch.

2. Apparatus according to claim 1 in which the isolation valves respective to each of said vessels are both simultaneously open or closed, and in which a valved drain conduit separate from the return line drains oil from the vessel when the respective isolation valve is closed.

3. Apparatus according to claim 1 in which said safety latch is a piston-cylinder motor with a shaft adapted to deny release of the releasable means when opening of the cover is not permitted by the controller.

4. Apparatus according to claim 1 in which a skirted shield is pivotally mounted to each vessel to overhang said cover and latched to the vessel to prevent manual access to said releasable means unless said shaft is turned to a position to close the respective first isolation valves.

5. Apparatus according to claim 4 in which each said shaft includes a handle which overhangs said shielding to prevent raising of said shield unless the shaft is in a rotary position to close the respective isolation valves.

6. Apparatus according to claim 1 in which a source of compressed gas is connected to each vessel above the respective barrier by a conduit, said last-named conduit including a valve adapted to admit said gas into said vessel to expel gas from the vessel, thereby to expedite cooling of the remaining contents of the vessel.

* * * * *